US005481826A

United States Patent [19]
Dickinson et al.

[11] Patent Number: 5,481,826
[45] Date of Patent: Jan. 9, 1996

[54] SELF-WATERING PLANTER WITH CONVERTIBLE BASE

[75] Inventors: Thomas Dickinson; Bradley D. Gale, both of St. Louis, Mo.

[73] Assignee: Contico International, Inc., St. Louis, Mo.

[21] Appl. No.: 349,684

[22] Filed: Dec. 5, 1994

[51] Int. Cl.⁶ .................................. A01G 9/02; A01G 9/04
[52] U.S. Cl. ........................... 47/39; 47/66; 47/71; 47/79
[58] Field of Search ........................... 47/71, 79 R, 81 S, 47/39 P, 66 R

[56] References Cited

U.S. PATENT DOCUMENTS

| | | |
|---|---|---|
| D. 20,335 | 11/1890 | Whilldin . |
| D. 42,400 | 4/1912 | Simons . |
| D. 118,230 | 12/1939 | Fader . |
| D. 137,049 | 1/1944 | Hill . |
| D. 137,050 | 1/1944 | Hill . |
| D. 198,040 | 4/1964 | Bonham et al. . |
| D. 199,336 | 10/1964 | Wanderer . |
| D. 242,161 | 11/1976 | Dziewulki . |
| D. 243,390 | 2/1977 | Mastrianni . |
| D. 245,643 | 8/1977 | Orfei . |
| D. 252,869 | 9/1979 | Dziewulski . |
| D. 265,387 | 7/1982 | Nattrass . |
| D. 266,690 | 10/1982 | Levin . |
| D. 298,222 | 10/1988 | Hobson . |
| D. 313,203 | 12/1990 | Carlson . |
| 314,682 | 3/1885 | Kaiser . |
| D. 319,199 | 8/1991 | Lomeli . |
| D. 320,763 | 10/1991 | Lomeli . |
| D. 322,047 | 12/1991 | Wolfenden . |
| D. 322,946 | 1/1992 | Claridge . |
| D. 324,005 | 2/1992 | Grosfillex . |
| D. 325,544 | 4/1992 | Foret . |
| D. 329,406 | 9/1992 | Grosfillex . |
| D. 331,549 | 12/1992 | Embree . |
| D. 331,727 | 12/1992 | Grosfillex . |
| D. 338,377 | 8/1993 | Scott, Jr. et al. . |
| D. 338,811 | 8/1993 | Scott, Jr. et al. . |
| D. 340,169 | 10/1993 | Scott, Jr. et al. . |
| D. 340,204 | 10/1993 | Grosfillex . |
| 2,550,602 | 4/1951 | Rothe . |
| 2,802,304 | 8/1957 | Hille . |
| 3,058,263 | 10/1962 | Reynolds . |
| 3,079,037 | 2/1963 | Schechter ................................ 47/71 |
| 3,220,144 | 11/1965 | Green . |
| 3,676,953 | 7/1972 | Delogne . |
| 3,906,666 | 9/1975 | Daenen et al. . |
| 4,315,382 | 2/1982 | Kay et al. . |
| 4,434,577 | 3/1984 | Holtkamp . |
| 4,912,875 | 4/1990 | Tardif . |
| 5,042,197 | 8/1991 | Pope . |

*Primary Examiner*—Henry E. Raduazo
*Attorney, Agent, or Firm*—Rogers, Howell & Haferkamp

[57] ABSTRACT

An improved planter apparatus for holding soil and plants and the like comprising a container and a base releasably securable to the bottom of the container. The container and base are provided with press-fit locking means for connecting the base to the container. The base is convertible such that it functions as a tray in an upright configuration and as a pedestal when inverted. Downwardly depending capillary wells project from the bottom of the container into association with reservoirs disposed within the base in both of its convertible configurations. The dimension of the base is such that, when the base is attached to the container in its upright configuration, multiple planters can be nested. The nestability of the apparatus provides for convenient handling of multiple planters as well as commercial packaging and transportation cost benefits.

20 Claims, 2 Drawing Sheets

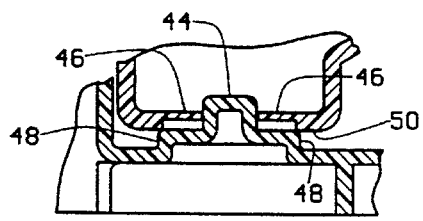
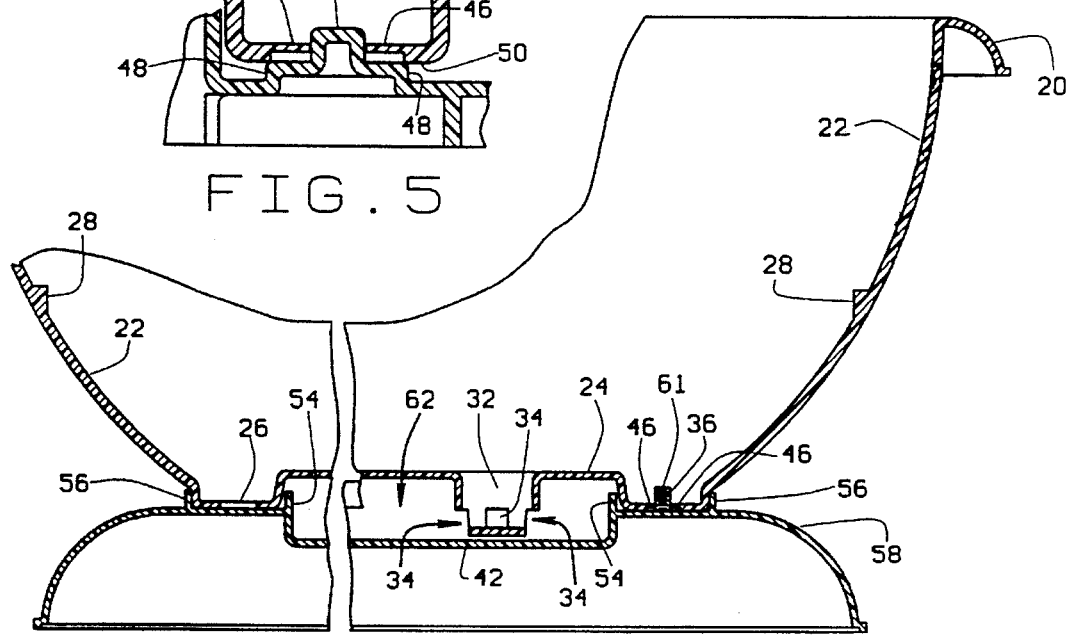
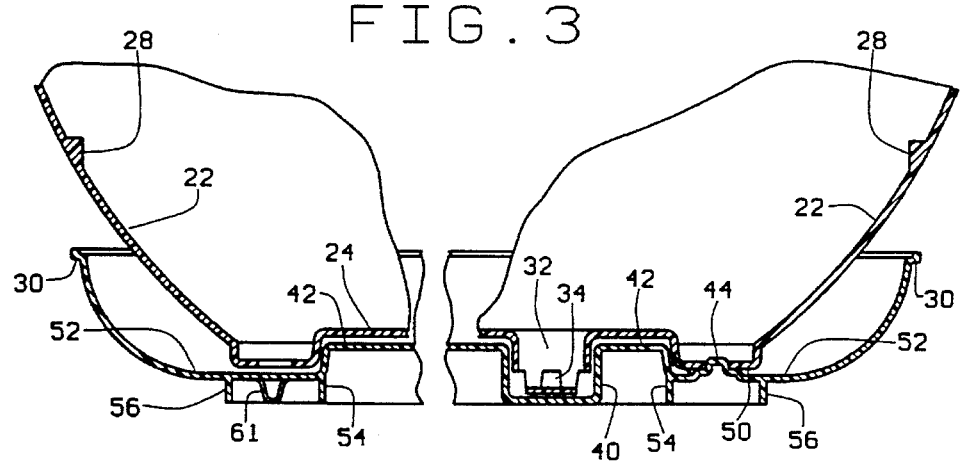
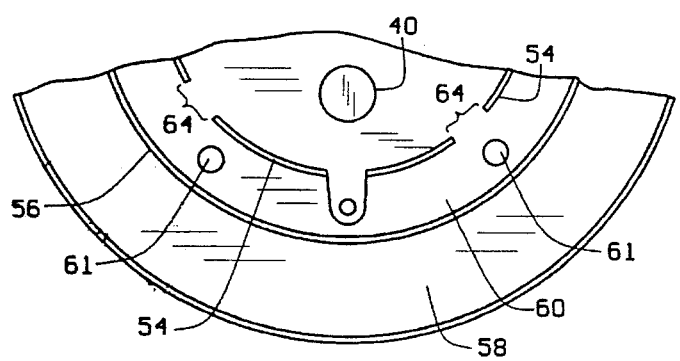
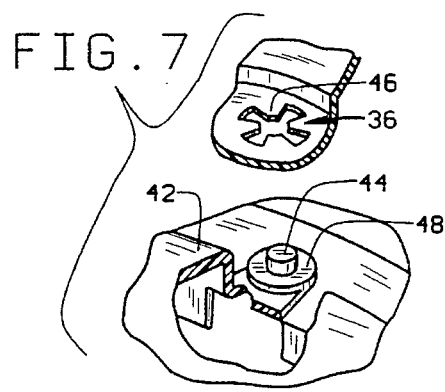

SELF-WATERING PLANTER WITH CONVERTIBLE BASE

BACKGROUND OF THE INVENTION

1. Field of the Invention

The invention herein disclosed relates to a planter for holding plants and soil and, more particularly, to a planter with a convertible base component having reservoirs and associated capillary wells which render the planter self-watering.

2. Description of the Related Art

Prior art inventions which provide, generally, planters having bases are known and are disclosed in the following U.S. patents: Rothe U.S. Pat. No. 2,550,602, issued; Hille U.S. Pat. No. 2,802,304, issued; Reynolds U.S. Pat. No. 3,058,263, issued; Green U.S. Pat. No. 3,220,144, issued; Delogne U.S. Pat. No. 3,676,953, issued; Daenen U.S. Pat. No. 3,906,666, issued; Kay U.S. Pat. No. 4,315,382, issued; Holtkamp U.S. Pat. No. 4,434,577, issued; and Tardif U.S. Pat. No. 4,912,875, issued.

These prior art inventions, however, relate to planters having bases which are either non-detachable or, if detachable, are not convertible. Further, none of the prior art planters provide for a convertible base in combination with associated capillary wells and reservoirs.

For example, as disclosed in U.S. Pat. No. 4,315,382 to Kay, there is shown and described only a planter consisting of a pot and a tray which snap lock by way of a plurality of protuberances disposed in the tray and corresponding apertures in the pot. Nowhere therein, however, is it shown or described that the tray is convertible or that associated capillary wells and reservoirs comprise the invention.

The Kay disclosure is representative of the prior art inventions and it illustrates that the art has lacked a planter apparatus having a base which is versatile, conveniently nestable, relatively inexpensive to manufacture and which provides a means for supplying water to plant life contained therein continuously, following conventional watering, and for an extended period of time.

The invention disclosed herein provides a planter apparatus which achieves these advantages in a manner not revealed by the prior art.

SUMMARY OF THE INVENTION

Various planter configurations are conventionally known. For example, planters constructed of wood, clay, plaster and metal have been in existence for many years. Quite often, planters such as these have been configured such that a tray is provided below the planter to collect surplus water not absorbed by the soil or the plants therein contained following watering. Where a tray is not so provided, planters such as these are often configured simply with drainage holes at the bottom of the planter to allow water to pass directly out of the planter and onto whatever surface is below the planter.

In either case, despite whether a tray is provided, the operation of plant watering has been an inefficient process. This is because, where a tray has not been provided, no measure is provided for utilizing or recycling water that passes through the planter without being absorbed by either the plant life or soil contained therein. Where a tray is provided, it is commonly used only to collect surplus water so as to protect the surface below the planter. Thus, conventionally, planters have not included structure which efficiently recycles surplus water following watering.

More recently, planters made of plastic have become known. Plastic planters often include detachable trays. Like earlier planters, however, many of the plastic planters having trays make no provision for recycling surplus water collected in the tray following watering.

Certain devices, however, are known which provide for the watering of plants as by capillary action. For example, in U.S. Pat. No. 3,220,144 to Green, a system which includes a feed tube, a reservoir and a water tower is disclosed. As explained in Green, water travels from the tower through a port to the reservoir. The water is then absorbed through the feed tube, which is packed with sand and disposed within a planter, by capillary action.

In U.S. Pat. No. 3,676,953 to Delogne wicks, which extend from a plant container into a water-filled reservoir, supply plant life therein contained with water by capillary action.

Also, in U.S. Pat. No. 4,434,577 to Holtkamp there is disclosed a similar invention which provides for the capillary transmission of water from a water containing tray to a pot by way of a water pervious pad having one or more hinged, movable tabs which can be bent downwardly through an opening for submergence in the water in the tray.

Despite that they relate to the watering of contained plants by capillary action, however, none of the above-described inventions, disclose or teach the capillary watering of contained plants by associated wells and reservoirs as in the present invention.

Further, despite that consumers have grown increasingly particular and, now more than ever before, demand that consumer products including planters adapt for variable use, planters are not known which have convertible base components and which provide structure for effectively recycling surplus water collected in the base in either of its upright or inverted configurations.

The present invention provides such a planter having a convertible base in combination with associated capillary wells and reservoirs. Thus, the planter of the present invention generally comprises a container component and a base component wherein the container has disposed at its bottom a plurality of capillary wells and wherein the base component, in either of its upright or inverted positions, has disposed thereon associated reservoir means.

When the base component is in its upright configuration, it functions as a tray. Because the planter thus configured is readily adaptable for use either by direct placement upon a supporting surface or, as by hanging, connecting means are provided in the present invention to assure that the tray remains secured to the container component when the base is secured thereto in either of its upright or inverted configurations.

When the present invention is disposed upon a supporting surface, a user has the option of inverting the base component in which case the base functions as a pedestal thereby giving the planter a wholly distinct appearance. When so configured, a downwardly depending annular ring in the bottom of the container fits into a corresponding annular channel disposed on the inverted surface of the base.

In both its upright and inverted configurations, the base provides reservoir means for the collection of water and for communication with the capillary wells which depend downwardly from the outside surface of the container bottom.

BRIEF DESCRIPTION OF THE DRAWINGS

Further objects and features of the present invention are revealed in the following Detailed Description of the Preferred Embodiment of the invention and in the drawing figures wherein:

FIG. 3 is a partial cross-section of the apparatus of the invention taken in the plane of line 3—3 of FIG. 1 and showing the base component in its attached, inverted configuration;

FIG. 4 is a partial cross-sectional view of the invention, similar to FIG. 3, showing the base component in its attached, upright configuration;

FIG. 5 is an enlarged partial cross-section detailing the connection between the container and base components of the apparatus of the present invention;

FIG. 6 is a partial bottom plan view of the base component in its inverted configuration; and FIG. 7 is an enlarged fragmentary view of the press-fit means by which the base component connects to the container when the base is in its upright configuration.

DETAILED DESCRIPTION OF THE PREFERRED EMBODIMENT

Figure 1:
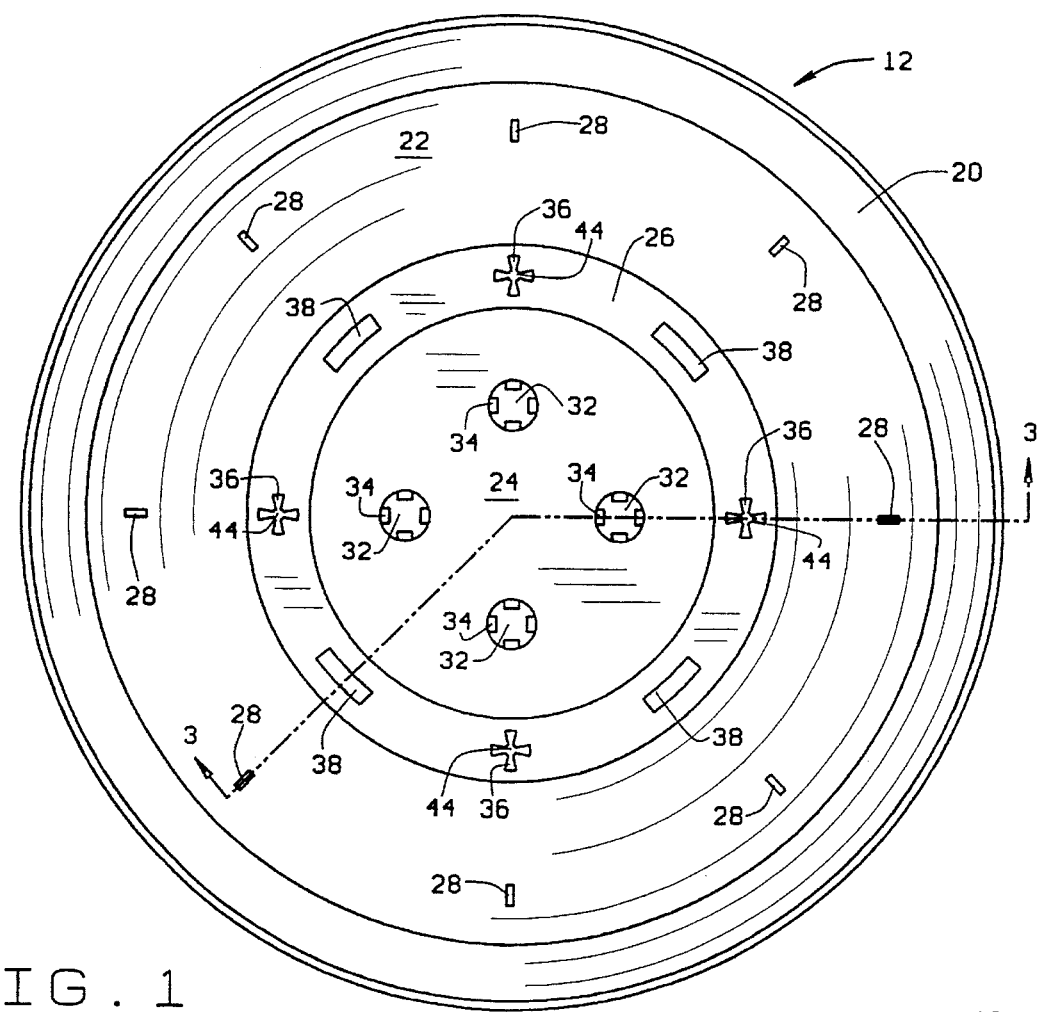
FIG. 1 is a top, plan view of the apparatus of the present invention.
Figure 2:
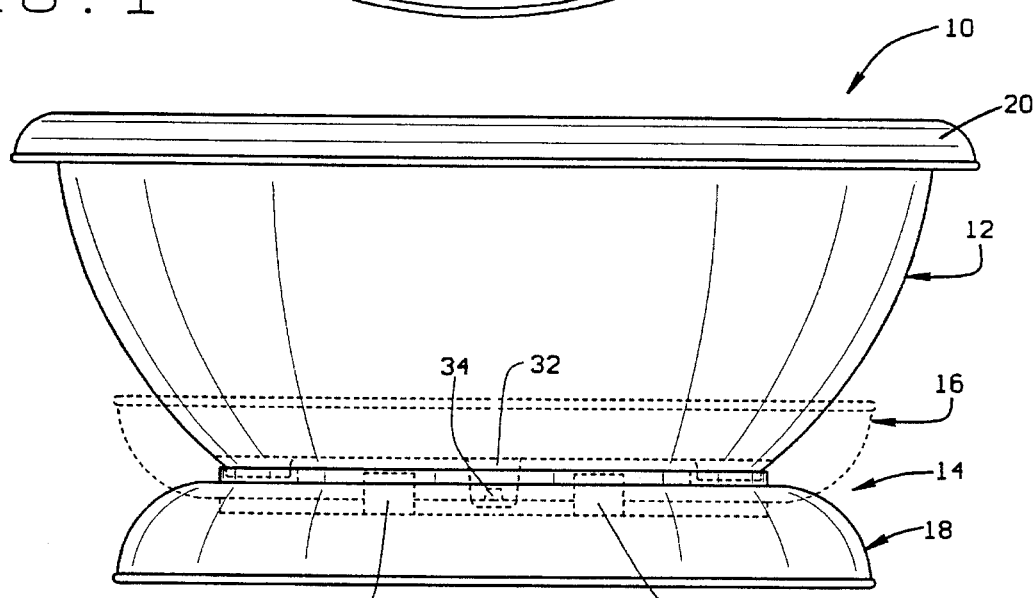
FIG. 2 is a side, elevational view of the apparatus of the present invention showing the container and base components, the base being shown in both its inverted position and upright position as depicted in phantom.

Referring now by reference numerals to the drawings which depict the invention in its preferred embodiment, attention is initially directed to FIGS. 1 and 2. It will be understood that shown therein is a planter 10 generally comprising a container 12 and a convertible base 14. The base 14 is depicted in FIG. 2 in both its upright 16 (phantom lines) and inverted 18 configurations.

In FIG. 1, it can be seen that the container 12 generally comprises an upper lip 20, an inner wall 22 and a bottom 24. Disposed between the inner wall 22 and the bottom 24 is an annular ring 26 which is stepped-down from both inner wall 22 and bottom 24.

Upper lip 20, inner wall 22, annular ring 26 and bottom 24 are all integrally formed as by injection molding. Thus, while any suitable materials can be employed for manufacturing the components of the present invention, it is preferred that moldable thermosetting and thermoplastic synthetic resinous materials such as olefin polymer and copolymeric materials like polypropylene and polyethylene be used. Desirably, these materials provide a sufficient degree of rigidity while retaining a degree of resiliency.

As can be seen in FIGS. 1, 3 and 4, there are disposed radially about inner wall 22 a plurality of stanchions 28 which support base lip 30 when one planter 10 is placed within another.

While planter 10 can be stacked or nested with base 14 in either of its upright 16 or inverted 18 configurations, it is preferred that nesting be performed with base 14 in its upright 16 configuration in order to achieve optimum compactness.

Disposed within bottom 24 are a plurality of capillary wells 32. As clearly shown in FIGS. 2, 3 and 4, capillary wells 32 are molded to bottom 24 such that they depend downwardly therefrom. The capillary wells 32 each include a plurality of cut-outs 34, as best shown in FIGS. 1 and 3, which facilitate the passage of water into and out of the container 12.

Positioned below both inner wall 22 and bottom 24 of the container 12 is molded and stepped-down annular ring 26. Radially disposed therein are a plurality of star-shaped connectors 36 and slots 38. Like cut-outs 34 in capillary wells 32, both connectors 36 and slots 38 also facilitate the passage of water into and out of the container 12.

When it is desired to attach container 12 to base 14 in its upright 16 configuration, such as is shown in phantom in FIG. 2 and in FIG. 4, capillary wells 32 are aligned with corresponding well reservoirs 40 which depend downwardly from the bottom 42 of base 14 when in its upright 16 configuration.

Preferably both capillary wells 32 and well reservoirs 40 are circular, the diameter of each capillary well being slightly smaller than that of each corresponding well reservoir 40.

Once the corresponding structures are aligned, the capillary wells 32 are lowered into the corresponding well reservoirs 40. Because the capillary wells 32 depend downward from the bottom 24 of container 12 to a distance slightly less than the distance the corresponding well reservoirs 40 depend downward of the bottom 42 of the base 14 in its upright 16 configuration, a suitable clearance is established within each well reservoir 40 to permit the unrestricted flow of water therein and into each capillary well 32. This relationship is shown particularly in FIG. 4.

With the capillary wells 32 and well reservoirs 40 in registry, star-shaped connectors 36 align with tray nipples 44 which are stepped-up from and circumferentially disposed thereabout the bottom 42 of the base 14 in its upright 16 configuration.

As shown particularly in FIGS. 1, and 4 and more particularly in FIGS. 5 and 7, star-shaped connectors 36 include individual tabs 46 which yield to graspingly engage tray nipples 44 when sufficient downward pressure is applied to container 12 when it is aligned with base 14 in its upright 16 configuration.

It should be noted that, because tray nipples 44 are molded in such a way as to project upwardly from spacers 48, sufficient clearance is provided between the underside 50 of annular ring 26 and the tray 52 region of base 14 in its upright 16 configuration so as to permit the unrestricted passage of water through slots 38 and connectors 36 disposed within the annular ring 26.

As can be appreciated, the passage of water through these structures and either into or out of the container 12 occurs in both directions depending upon how full the tray 50 is with water.

In operation, the planter 10 of the present invention (when configured with its base 14 in its upright 16 position) is readily adaptable to be placed upon a supporting surface or, following the attachment of appropriate suspension means (not shown) for use as a hanging planter. Once the base 14 is secured to the container 12, as described, it is only detachable when sufficient prying force is applied.

As configured, when plants contained within the planter are watered, water migrates through the soil toward the bottom 24 of the container 12. Once the water reaches the bottom 24, it flows both into the individual capillary well 32/well reservoir 40 structures and also into the stepped-down annular ring 26 where it disperses onto tray 52 after having passed through slots 38 and star-shaped connectors 36.

Provided that sufficient watering occurs to fill the well reservoir 40 structures and the tray 52, water will then be absorbed by the plant life until such time as the water is either totally absorbed or evaporated.

As indicated at the outset, and as depicted generally in FIG. 2, the base 14 is convertible such that, in addition to being adapted for connection to the container 12 in its upright 16 configuration, it is also adapted for use in its inverted 18 configuration whereupon it functions as a pedestal.

FIG. 3 provides, perhaps, the best depiction of the planter 10 of the present invention when adapted for use with base 14 in its inverted 18 configuration. In FIG. 3 it can be seen that the underside 50 of annular ring 26 fits between concentric inner 54 and outer 56 annular ribs which extend upwardly and away from the bottom exterior surface 58 of the base 14.

Basically, the distance between the inner and outer ribs 54 and 56 forms a channel 60 the width of which corresponds with the width of the underside 50 of the annular ring 26. Thus, when so configured, the container 12 rests securely within the channel 60 as shown in FIGS. 3 and 6.

Pedestal nipples 61, shown in FIGS. 3 and 6 and particularly in FIG. 4, are also provided and are disposed circumferentially within and upwardly from channel 60. When base 14 is attached to container 12 in its inverted 18 configuration, these structures function in conjunction with star-shaped connectors 36 in the same manner as do tray nipples 44 when base 14 is in its upright 16 configuration. This structure is shown in FIGS. 3 and 6. Thus, base 14 securely attches to container 12 in both its upright 16 and inverted 18 configurations thereby facilitating ease of handling and movement of planter 10 both when empty and when filled with soil and plant life.

Also shown in FIG. 3 is the cavity reservoir 62 which is formed when container 12 is mated with base 14 in its inverted 18 configuration. While not shown in FIG. 3 (rather See FIG. 4), well reservoirs 40 which depend downwardly from the bottom 24 of base 14 in its upright 16 configuration project upwardly into cavity reservoir 62 when the base 14 is in its inverted 18 configuration. Thus, to properly position the container 12 with the base in this configuration, the container need only be rotated slightly until the capillary wells 32 are out of alignment with well reservoirs 40.

When water is added to plants contained within the planter 10 in its pedestal configuration, the water migrates to the bottom 24 of the container whereupon it is dispersed into cavity reservoir 62 through capillary wells 32. Also, as can be seen in FIG. 6, gaps 64 in the annular inner 54 rib allow any water that migrates through slots 38 and/or star-shaped connectors 36 to flow into cavity reservoir 62.

As is true when base 14 is assembled with container 12 in the upright 16 configuration, when sufficient water is added to fill cavity reservoir 62 of planter 10 with base 14 inverted, water can then be absorbed by the contained plant life until such time as as the water is either totally absorbed or evaporated.

As can readily be appreciated, base 14 easily and conveniently separates from container 12 for cleaning or removal of any debris impeding water flow in either of its upright 16 or inverted 18 configurations.

The foregoing description of specific embodiments of the present invention has been presented for purposes of illustration and description. It is not, however, intended to limit the invention to the precise embodiments disclosed because, obviously, modifications and variations are possible in light of the above teaching. The described embodiments were chosen in order to best explain the principles of the invention and its practical applications, to thereby enable others skilled in the art to best utilize the invention and various modifications as are suited to the particular use contemplated.

Thus, while the present invention has been described by reference to specific embodiments, it should be understood that modifications and variations of the invention may be constructed without departing from the scope of the invention as defined by the appended claims.

What is claimed is:

1. A self-watering planter comprising:
   a container having upwardly extending walls and a bottom from which downwardly depend one or more capillary wells for facilitating water transfer; and
   a convertible base which, in a first upright position, has one or more well reservoirs for collecting water and for correspondingly receiving each of said capillary wells and which, in a second inverted position, has a cavity reservoir for collecting water and for correspondingly receiving each of said capillary wells.

2. The planter of claim 1, wherein said convertible base has a bottom with interior and exterior surfaces and wherein, in said first upright position, said base releasably secures to said container by way of associated connectors disposed, respectively, on said container bottom and said interior surface of said base.

3. The planter of claim 1, wherein said convertible base has a bottom with interior and exterior surfaces and wherein, in said second inverted position, said base releasably secures to and engagingly receives said container, respectively, by way of associated connectors on said container bottom and said interior surface of said base and by way of adaptive members disposed upon said exterior surface of said base.

4. The planter of claim 1 wherein said upwardly extending walls have disposed thereon, a plurality of stanchions for supporting said base when two or more planters are nested.

5. The planter of claim 2, wherein said connectors comprise star-shaped connectors disposed on said bottom of said container and associated nipples disposed on said interior surface of said base.

6. The planter of claim 3, wherein:
   said container has disposed about its bottom a stepped-down substantially annular ring;
   said connectors comprise star-shaped connectors disposed on said bottom of said container and associated nipples disposed on said exterior surface of said base; and
   said adaptive members comprise a pair of associated concentric, annular ribs which extend upwardly of said exterior surface of said base.

7. A self-watering planter comprising:
   a container having upwardly extending walls and a bottom;
   a convertible base for the collection of water which attaches to said container in a first upright position such that the base functions as a tray and in a second inverted position such that said base functions as a pedestal; and
   means for transferring water collected in said base to plant life contained in said container.

8. The planter of claim 7, wherein said base has a bottom with interior and exterior surfaces and wherein said base, in said first upright position, releasably secures to said container by way of associated star-shaped connectors disposed about said bottom of said container and nipples disposed about said interior surface of said base.

9. The planter of claim 7, wherein said base has a bottom with interior and exterior surfaces and wherein said base, in said second inverted position, releasably secures to said container by way of associated connectors and, further, has adaptive members disposed upon said exterior surface for engagingly receiving said container.

10. The planter of claim 7 wherein said upwardly extending walls have disposed thereon, a plurality of stanchions for supporting said base when two or more planters are nested.

11. The planter of claim 9, wherein said container has disposed about its bottom a stepped-down substantially annular ring and wherein:

said connectors comprise star-shaped connectors disposed on said bottom of said container and associated nipples disposed on said exterior surface of said base; and said adaptive members comprise a pair of associated concentric, annular ribs which extend upwardly of said exterior surface of said base.

12. The planter of claim 7, wherein said means for transferring water comprises a system of associated capillary wells disposed about said bottom of said container and reservoirs disposed about said bottom of said base.

13. The planter of claim 12, wherein said capillary wells depend downwardly from said bottom of said container and wherein, in said first upright position, associated well reservoirs are disposed about said bottom of said base.

14. The planter of claim 12, wherein said capillary wells depend downwardly from said bottom of said container and wherein, in said second inverted position, an associated cavity reservoir is disposed about said bottom of said base.

15. A self-watering planter comprising:

a container having upwardly extending walls and a bottom from which downwardly depend one or more capillary wells for facilitating water transfer;

a convertible base which, in a first upright position, has one or more well reservoirs for collecting water and for correspondingly receiving each of said capillary wells and which, in a second inverted position, has a cavity reservoir for collecting water and for correspondingly receiving each of said capillary wells; and means disposed within said container for supporting said base when two or more planters are nested.

16. The planter of claim 15, wherein said convertible base has a bottom with interior and exterior surfaces and wherein, in said first upright position, said base releasably secures to said container by way of associated connectors disposed, respectively, on said container bottom and said interior surface of said base.

17. The planter of claim 15, wherein said convertible base has a bottom with interior and exterior surfaces and wherein, in said second inverted position, said base releasably secures to said container by way of associated connectors and, further, has adaptive members disposed upon said exterior surface for engagingly receiving said container.

18. The planter of claim 15, wherein said means for supporting said base comprises:

a plurality of stanchions, approximately equally spaced one from the other, disposed upon said upwardly extending walls of said container.

19. The planter of claim 16, wherein said connectors comprise star-shaped connectors disposed on said bottom of said container and associated nipples disposed on said interior surface of said base.

20. The planter of claim 17, wherein said container has disposed about its bottom a stepped-down substantially annular ring and wherein:

said connectors comprise star-shaped connectors disposed on said bottom of said container and associated nipples disposed on said exterior surface of said base; and said adaptive members comprise a pair of associated concentric, annular ribs which extend upwardly of said exterior surface of said base.

* * * * *